(12) United States Patent
Leslie et al.

(10) Patent No.: US 7,458,617 B2
(45) Date of Patent: Dec. 2, 2008

(54) COMPOSITE DRILL PIPE

(75) Inventors: James C. Leslie, Fountain Valley, CA (US); James C. Leslie, II, Mission Viejo, CA (US); James Heard, Huntington Beach, CA (US); Liem Truong, Anaheim, CA (US); Marvin Josephson, Huntington Beach, CA (US); Hans Neubert, Anaheim, CA (US)

(73) Assignee: Advanced Composite Products & Technology, Inc., Huntington Beach, CA (US)

( * ) Notice: Subject to any disclaimer, the term of this patent is extended or adjusted under 35 U.S.C. 154(b) by 0 days.

(21) Appl. No.: 10/952,135

(22) Filed: Sep. 28, 2004

(65) Prior Publication Data

US 2006/0066102 A1 Mar. 30, 2006

(51) Int. Cl.
*F16L 15/00* (2006.01)
(52) U.S. Cl. .................. 285/390; 285/222.1
(58) Field of Classification Search .......... 285/294.1, 285/293.1, 239, 238, 390, 222.1, 222.2, 222.3, 285/222.4, 222.5
See application file for complete search history.

(56) References Cited

U.S. PATENT DOCUMENTS

| 2,045,520 A | 6/1936 | Davison |
| 2,139,745 A | 12/1938 | Goodall |
| 3,406,724 A | 10/1968 | Carlstrom et al. |
| 3,467,764 A | 9/1969 | Knapp |
| 3,768,269 A | 10/1973 | Broussard et al. |
| 3,784,239 A | 1/1974 | Carter et al. |
| 3,799,587 A | 3/1974 | Chevalier et al. |
| 4,120,521 A | 10/1978 | Parmann |
| 4,140,324 A | 2/1979 | Mulas et al. |
| 4,171,560 A | 10/1979 | Garrett |
| 4,236,386 A | 12/1980 | Yates et al. |
| 4,278,138 A | 7/1981 | Rowley et al. |
| 4,310,059 A | 1/1982 | Moore |
| 4,329,193 A | 5/1982 | Sznopek et al. |
| 4,385,644 A | 5/1983 | Kaempen |
| 4,530,379 A | 7/1985 | Policelli |
| 4,548,428 A | 10/1985 | Ruhle |
| 4,614,369 A | 9/1986 | Overath et al. |
| 4,619,470 A | 10/1986 | Overath et al. |
| 4,630,849 A | 12/1986 | Fukui et al. |
| 4,647,078 A | 3/1987 | Lundy |

(Continued)

FOREIGN PATENT DOCUMENTS

DE  1 188 793  3/1965

(Continued)

*Primary Examiner*—Aaron M Dunwoody
(74) *Attorney, Agent, or Firm*—Fulwider Patton LLP

(57) ABSTRACT

A composite pipe segment is formed to include tapered in wall thickness ends that are each defined by opposed frusto-conical surfaces conformed for self centering receipt and intimate bonding contact within an annular space between corresponding surfaces of a coaxially nested set of metal end pieces. The distal peripheries of the nested end pieces are then welded to each other and the sandwiched and bonded portions are radially pinned. The composite segment may include imbedded conductive leads and the axial end portions of the end pieces are shaped to form a threaded joint with the next pipe assembly that includes a contact ring in one pipe assembly pierced by a pointed contact in the other to connect the corresponding leads across the joint.

8 Claims, 4 Drawing Sheets

U.S. PATENT DOCUMENTS

| | | |
|---|---|---|
| 4,649,960 A | 3/1987 | Policelli |
| 4,679,831 A | 7/1987 | Kielminski |
| 4,701,231 A | 10/1987 | Peters et al. |
| 4,786,536 A | 11/1988 | Kaempen |
| 4,810,010 A | 3/1989 | Jones |
| 4,813,715 A | 3/1989 | Policelli |
| 4,865,356 A | 9/1989 | Moore et al. |
| 4,872,519 A | 10/1989 | Kopecki |
| 4,889,318 A | 12/1989 | Sisk |
| 4,893,658 A | 1/1990 | Kimura et al. |
| 4,968,545 A | 11/1990 | Fellman et al. |
| 5,062,914 A | 11/1991 | Fuchs et al. |
| 5,082,314 A | 1/1992 | Aubry et al. |
| 5,097,870 A | 3/1992 | Williams |
| 5,105,854 A | 4/1992 | Cole et al. |
| 5,148,877 A | 9/1992 | MacGregor |
| 5,188,401 A | 2/1993 | Staniforth |
| 5,211,429 A | 5/1993 | Charlson et al. |
| 5,233,737 A | 8/1993 | Policelli |
| 5,236,018 A | 8/1993 | Kobayashi et al. |
| 5,288,109 A | 2/1994 | Auberon et al. |
| 5,332,049 A | 7/1994 | Tew |
| 5,398,975 A | 3/1995 | Simmons |
| 5,443,099 A | 8/1995 | Chaussepied et al. |
| 5,507,346 A | 4/1996 | Gano et al. |
| 5,579,854 A | 12/1996 | Barry |
| 5,685,576 A | 11/1997 | Wolfe et al. |
| 5,713,423 A | 2/1998 | Martin et al. |
| 5,816,344 A | 10/1998 | Turner |
| 5,895,079 A | 4/1999 | Carstensen et al. |
| 5,908,049 A | 6/1999 | Williams et al. |
| 5,913,337 A | 6/1999 | Williams et al. |
| 5,921,285 A | 7/1999 | Quigley et al. |
| 5,927,409 A | 7/1999 | Turner |
| 5,944,124 A | 8/1999 | Pomerleau et al. |
| 5,988,695 A | 11/1999 | Corbett, Jr. |
| 6,113,159 A | 9/2000 | Corbett, Jr. |
| 6,186,558 B1 | 2/2001 | Komolrochanaporn |
| 6,244,631 B1 | 6/2001 | Payne et al. |
| 6,315,002 B1 | 11/2001 | Antal et al. |
| 6,378,633 B1 | 4/2002 | Moore et al. |

FOREIGN PATENT DOCUMENTS

| | | |
|---|---|---|
| EP | 0 226 996 | 7/1987 |
| EP | 0 264 446 | 4/1988 |
| EP | 0 266 810 | 5/1988 |
| EP | 0 292 998 | 11/1988 |
| EP | 0 361 639 | 4/1990 |
| FR | 2 656 403 | 6/1991 |
| GB | 1 522 240 | 8/1978 |
| WO | WO 99/17045 | 4/1999 |

COMPOSITE DRILL PIPE

STATEMENT OF GOVERNMENT INTEREST

This invention was partly funded by the Government of the United States of America under Cooperative Agreement No. DE-FC26-99FT40262 awarded by the U.S. Department of Energy and the Government of the United States of America has certain rights in the invention.

BACKGROUND OF THE INVENTION

1. Field of the Invention

The present invention relates to composite drill pipes and the method for forming same, and more particularly to composite pipe segments bonded to metal end fittings for joining thereof into a pipe string, wherein each fitting may include bridging connections for transmission of signal and/or power carried on leads imbedded in the composite.

2. Description of the Prior Art

As the known formations containing oil and/or gas are depleted drilling for new deposits is invariably at a greater depth and/or greater lateral reach, with the depth and reach limits determined mainly by the cumulated weight and unit strength of the pipe string. Traditionally, the use of steel pipe has fixed these weight-to-strength ratios, setting a limit that has been particularly bothersome in ultra-deep, deep directional and/or extended reach drilling caused either by the weight of the pipe or by the weight induced friction of the rotating pipe string as it rests on the walls of the well bore, or rubs against the casing wall. The increasingly large expenses of remote drilling or drilling from a platform, moreover, impose some rigor in directional response which is best effected by drill pipe capable of short turning radii, again a facility that is difficult to obtain in steel pipe. The drilling entrepreneur, therefore, has been limited for some time by the stiffness; the unit weight; and the fatigue, shear and tensile strength limits of steel pipe. As a result various material alternatives have been proposed both to reduce the linear weight and flexure of the string and to improve its fatigue, shear and tensile limits. This search for light weight and high strength material substitutes has led to composite pipe structures, particularly since composites also offer the added benefits of being more resistive to corrosion.

Composites, however, are less effective at forming mechanical joints while virtually all drilling operations require limited length pipe segments, determined by the size of the drilling rig and/or the handling power of any lifting equipment, and the step of joining such pipe segments into a long string is a fundamental aspect of all drilling. For this reason the more recent development focus has been directed to the interface between the composite wall of the pipe and metal end fittings on each end of the segment.

Composite materials have a further advantage that heretofore has not been extensively recognized, namely the convenient imbedding of signal and/or power conductors into the laminates forming the pipe wall. This function is particularly useful with short radius directional drilling as it allows for an uninterrupted, continuous down hole signal feedback and also control augmentation while drilling, thus maximizing the effectiveness of the invariably very high drilling costs at the remaining remote or deeply submerged formations. This synergistic aspect of composite pipe has not been fully recognized nor exploited in the art, simply because the technical challenge of forming an effective connection between the composite tube wall and the end fitting has overwhelmed all other considerations. The process of imbedding conductors or connecting them across a joint has therefore been relegated to inattention.

At the core is the inherent difficulty in forming a high integrity interface between the composite pipe wall and the joining surfaces of the end fitting. In the past fitting assemblies with variously opposing surface geometries have been proposed to effect a secure capture of the composite end within the fitting. Some examples of such end fittings include those taught in U.S. Pat. No. 5,233,737 to Policelli; U.S. Pat. No. 4,810,010 to Jones; U.S. Pat. No. 6,315,002 to Antal et al.; and others. While suitable for the purposes intended each of the foregoing assemblies include threaded or otherwise releasably engaged parts clamping the composite between each other with inherently uneven load concentrations resulting in highly uneven shear stresses. This uneven load distribution between adjacent parts, of course, results in correspondingly uneven local strain deformations when exposed to the various high loadings in the course of use. There is therefore an inherent incidence of local bond separation between the composite itself and the adjoining fitting surface, with some consequence for failure.

Alternatively, end fitting assemblies have been proposed in which radial pins or other radial fasteners are added to the assembly, as exemplified by the teachings of U.S. Pat. No. 5,332,049 to Tew; U.S. Pat. No. 5,288,109 to Auberon et al.; U.S. Pat. No. 5,443,099 to Chaussepied et al.; and others. Once again, while some improvement in structural integrity is realized from these radial interconnections the essentially separated nature of the assembly components is also susceptible to uneven load transfer with the consequent local separations an inherent possibility.

An end fitting structure conformed for bridging interconnection of imbedded leads and also adapted for assembly that results in a single, integral structure clamped and bonded to the composite is extensively desired and it is the implementation of one such end fitting that is disclosed herein.

SUMMARY OF THE INVENTION

Accordingly, it is the general purpose and object of the present invention to provide an end fitting assembly that is mated to the composite pipe ends as an integral structure.

Other objects of the invention are to provide an end fitting assembly conformed to mate to the ends of composite pipe segments and to interconnect with electrical, fiberoptic or other leads imbedded in the segment.

Yet further objects of the invention are to provide mating end fittings on the ends of composite pipe segments which further include bridging interconnections thereacross for connecting corresponding leads imbedded in the mated segments.

Additional objects of the invention are to provide a threaded pipe segment interconnection for joining composite pipe that is also useful in transmitting data, power, optical or other signals across the threaded joint.

Briefly, these and other objects are accomplished within the present invention by forming reinforced composite tubular segments each of a generally uniform wall thickness each having both ends linearly tapered to a reducing wall thickness over a fixed axial increment. Both the interior and exterior tapers of these substantially identical end surfaces are then each mated and bonded to corresponding linearly tapered portions of cylindrical inner and an outer metal fitting pieces with the remaining parts of the inner and outer pieces being further conformed for a closely fitted annular nested assembly. Once fully nested the dimensions of the tapered gap thus formed between the fittings closely matches the end tapers of each composite segment, assuring an intimate surface contact and therefore an effective bond over the full surface of the metal to composite interfaces, the centralizing taper assuring this bond with or without bond line control. The end of the interior piece is formed to extend beyond its nested receipt within the exterior piece to form either the male or female end of a threaded drill pipe connection, commonly referred to as the 'pin end' and the 'box end' of the pipe segment.

Those skilled in the art will appreciate that the foregoing assembly results in a fairly large composite-to-metal interface surface for effecting the bond, thus widely diffusing any load concentrations thereacross. Nonetheless, the greatly dissimilar elastic moduli of steel and composite and the rugged environment associated with drilling result in wholly unpredictable loading patterns across the bonding joint with a substantial risk of relative movement between the parts producing localized deflection mismatches and consequent local separation. This then starts the failure avalanche that propagates into full separation. To minimize the incidence of such relative movement of parts the present invention provides further steps for integrating the assembly into a unitary structure once the initial bond has been made. More precisely, the distal portions of the nested inner and outer pieces are each in direct contact presenting adjacent exterior flange rings which are then welded to each other while the portions thereof forming the interface cavity with the composite end bonded therein are cooled by water spray. Following this welding step the bonded portion receives a plurality of radial pins press fit and secured through matched openings in the tapered skirts of the inner and outer piece and also through a corresponding opening in the tapered end of the composite pipe segment bonded therein to fully tie the separate items into an integral structure, with the press fit receipt of the pins in the more resilient composite insuring an internal compression prestress across the bond. In this manner all the conveniences of a part-wise assembly are retained while the resulting end structure has all the advantages of an integral unit. More importantly, this manner of assembly insures a self-centralizing benefit where the tapered ends of the composite segment themselves provide the reference structure against which the inner and outer pieces are aligned. Once this centralized alignment is fixed by bonding the intimately aligned surfaces to each other the subsequent welding and pinning of the nested pieces assures the end structure integrity necessary to transfer the large stresses across the joint.

The same convenience of part-wise assembly that results in an integral structure is also useful in realizing further benefits associated with composite tubes, namely the benefit of bridging across the pipe joint electrical or signal continuity between imbedded signal or power leads in each segment. The part-wise assembly process allows insertion of exposed ends of imbedded conductors into passages formed in the exterior piece for connection to axially aligned spring biased pins mounted on pistons within a sealed manifold. Application of pressure to the manifold then extends the pins against their spring bias to pierce the insulation covering on concentric annular contact rings deployed in the opposed mating surface of the next adjacent exterior piece threadably mated therewith, with the contact rings in turn connected for electrical contact with corresponding conductors imbedded in the next segment, and so on. As the pipe joint of the next segment is threadably coupled to the pipe string, contact is then effected across the joint by applying pressure to the manifold, extending the pins through the insulation on the rings. Thus a quick and expedient pressurizing step thus results in signal or power transmission down the well bore. Of course, upon the withdrawal of the pipe string this same pressure is released to withdraw, by their spring bias, the pins from their pierced contact prior to unthreading the joint.

The foregoing sequence may be utilized with composite segments of a layered construction including one or more impervious barrier sheets wrapped between the fiber layers. This manner of construction lends convenience to mandrel release by introducing internal pressure once the core layer has been formed with the pressurized core then serving as its own mandrel for next the successive wrappings of fiber and further interleaved membranes. Those in the art will appreciate that this layered construction process allows for introduction of sealant between selected layers, while appropriate compliance selection of the other layers and the fiber wrapping angle can then be used control the bending compliance, and thus the turning radius, of the resulting piece. In this manner all the desired functions and attributes can be accommodated in the assembly process which then renders pipe segments that are particularly useful in the ultra deep and extended reach drilling efforts that are currently required.

DESCRIPTION OF THE PREFERRED EMBODIMENT

Figure 1:
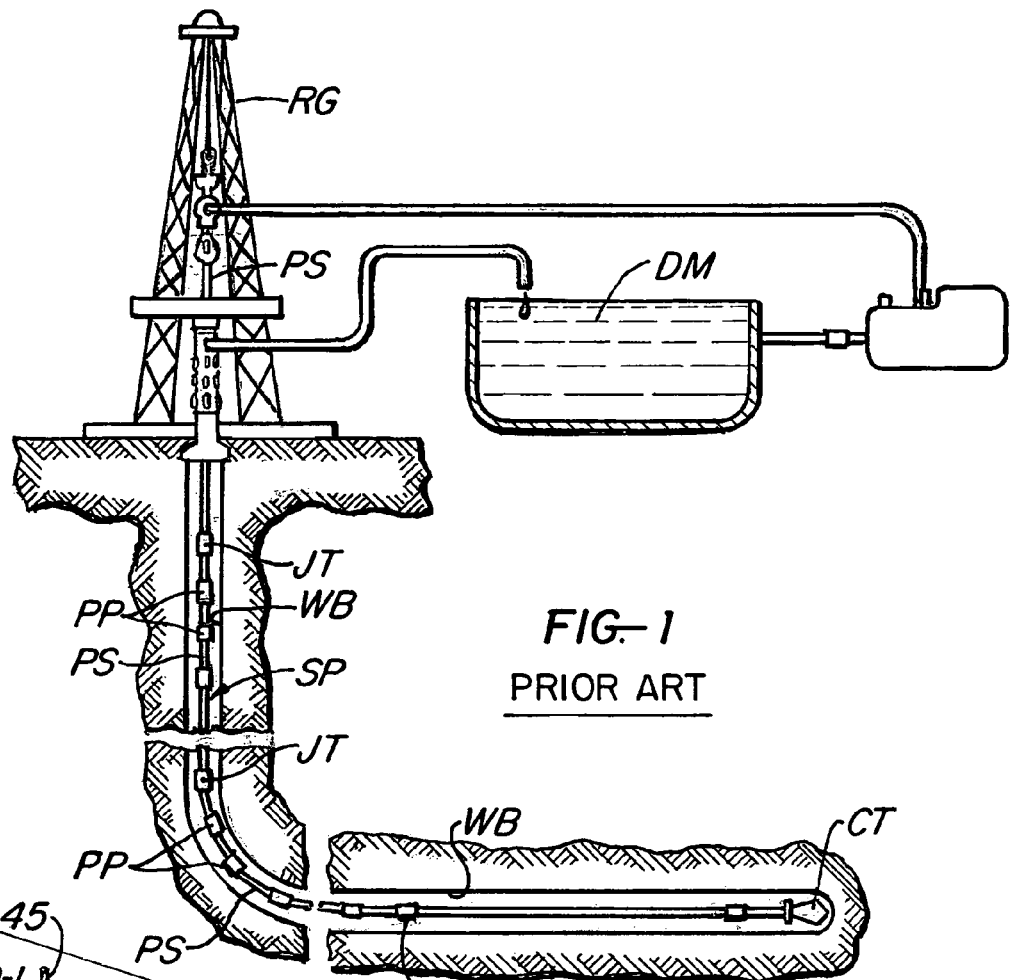
FIG. 1 is a perspective illustration, separated by parts, of a conventional drill pipe string extended into a well bore.

As shown in FIG. 1 current drilling practices depend on a string SP composed of drill pipe segments PS connected end-to-end to turn a cutting tool CT mounted on the lower string end. In the course of such turning the tool CT grinds and penetrates through the bottom of the well bore WB with the particulates continuously brought out to the surface by a circulating flow of drilling mud DM pumped into the bore to equalize bore pressures. As readily available formations are depleted these drilling projects now extend to much greater depth, and/or greater lateral reach, with the weight of the pipe string SP and/or its friction load in the well bore setting the practical exploration limits. The complexity of a drilling rig RG conformed for such long reach drilling is enormous and the logistics of its movement, alone, encourage directional capability along with an increasing pipe string. This same complexity of the rig also determines the manipulation convenience of each of the pipe segments PS, again resulting in its own logistic and mechanical constraints resolved by the size of the rig (or off-shore platform) that can be effectively implemented at the well site, thereby limiting the length of each segment PS and multiplying the number of required joints JT that need to be made to extend the string to the desired depth. The combined weight of the string, including all the down hole joints and any wear knots or pipe protectors PP shielding the pipe from wall contact, along with the friction load resulting from this wall contact, are thus resolved at the last surface joint which sets the design limit. It is within this limit that the rig operator tries to discover oil by periodic insertion of instruments down the bore, or simply by inspecting the drilling debris brought to the surface.

In addition to the above physical concerns there are also those imposed by various laws and ordinances dealing with the environment. There is currently substantial public resistance to the equipment clutter associated with crude oil production appearing in one's neighborhood, further promoting directional drilling, a technique that compounds torsional loading as very long drill pipe strings are turned while resting on the wall of the well. This same technique also demands shorter radius turns, or a more flexible pipe, and also accurate instrumentation to inform the operator of the actual direction that is being drilled and of any formation details that are encountered. For all these reasons light weight, high strength, but elastic pipe is desired, particularly if signal and power conductors can be combined therewith. All these concerns are now substantially resolved in the inventive structure and process described by reference to FIGS. 2-7.

Figure 2:
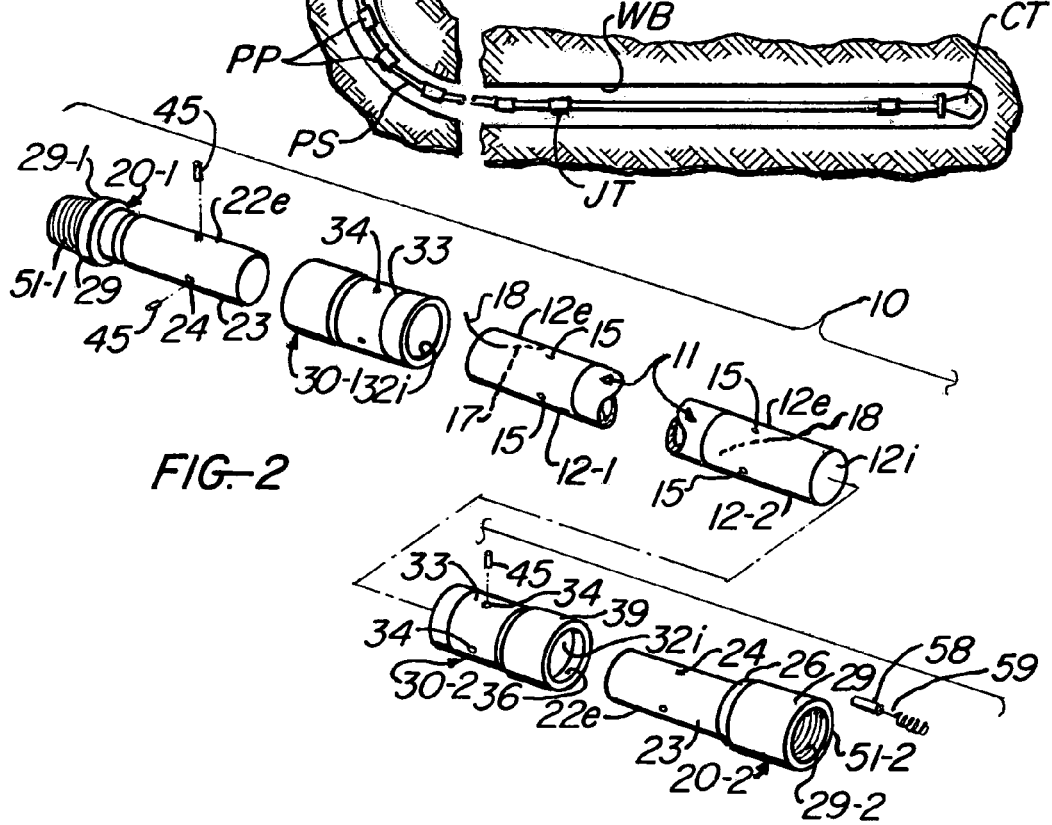
FIG. 2 is yet another perspective illustration, separated by parts and in partial section, of the inventive metal to composite end fitting assembly.
Figures 3, 4:
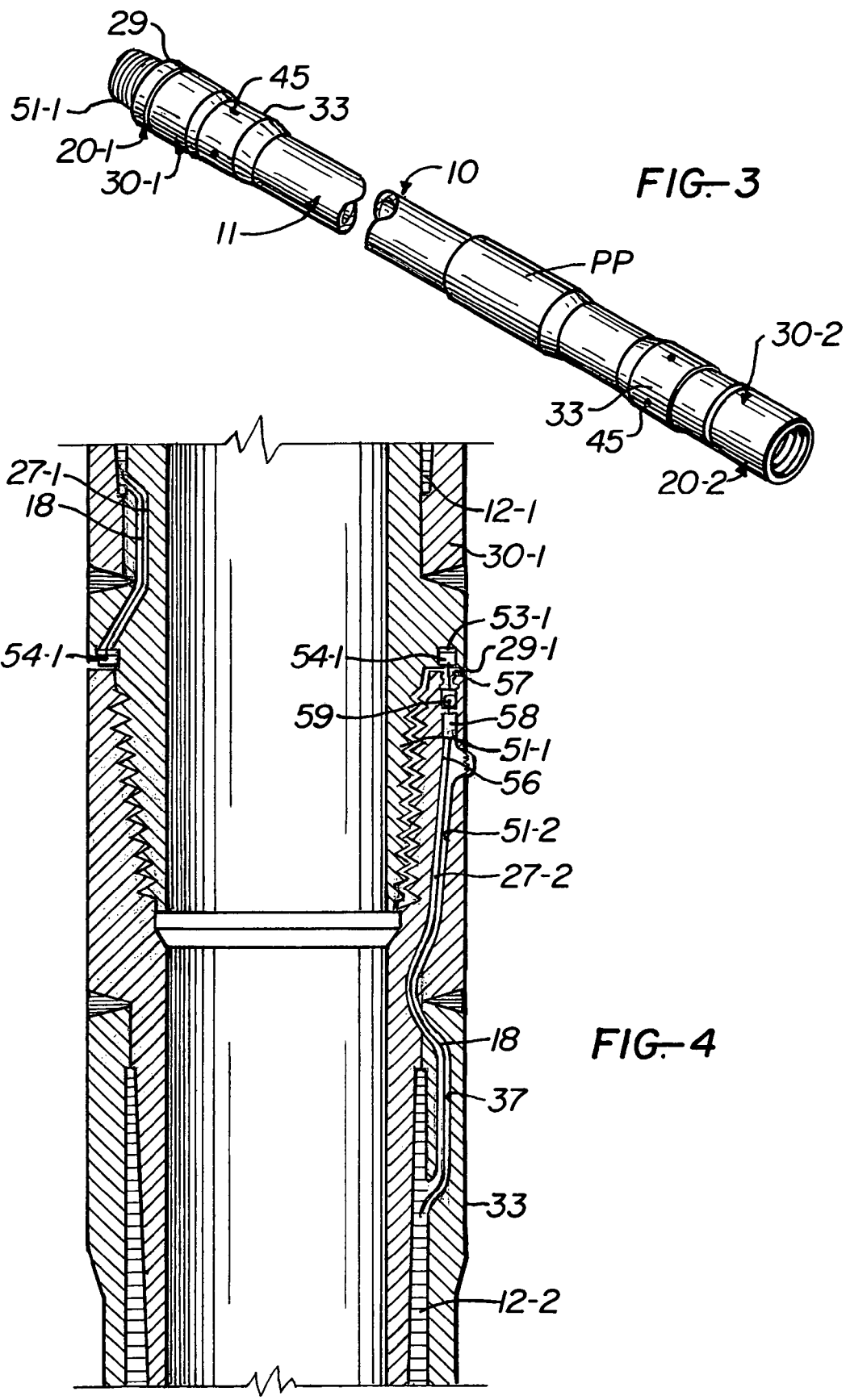
FIG. 3 is a further perspective illustration of the inventive composite pipe assembly incorporating the parts illustrated in FIG. 2.
FIG. 4 is a side view, in section, of a pipe joint illustrating the inventive pressure activated electrical contact mechanism in accordance with the present invention.
Figure 5:
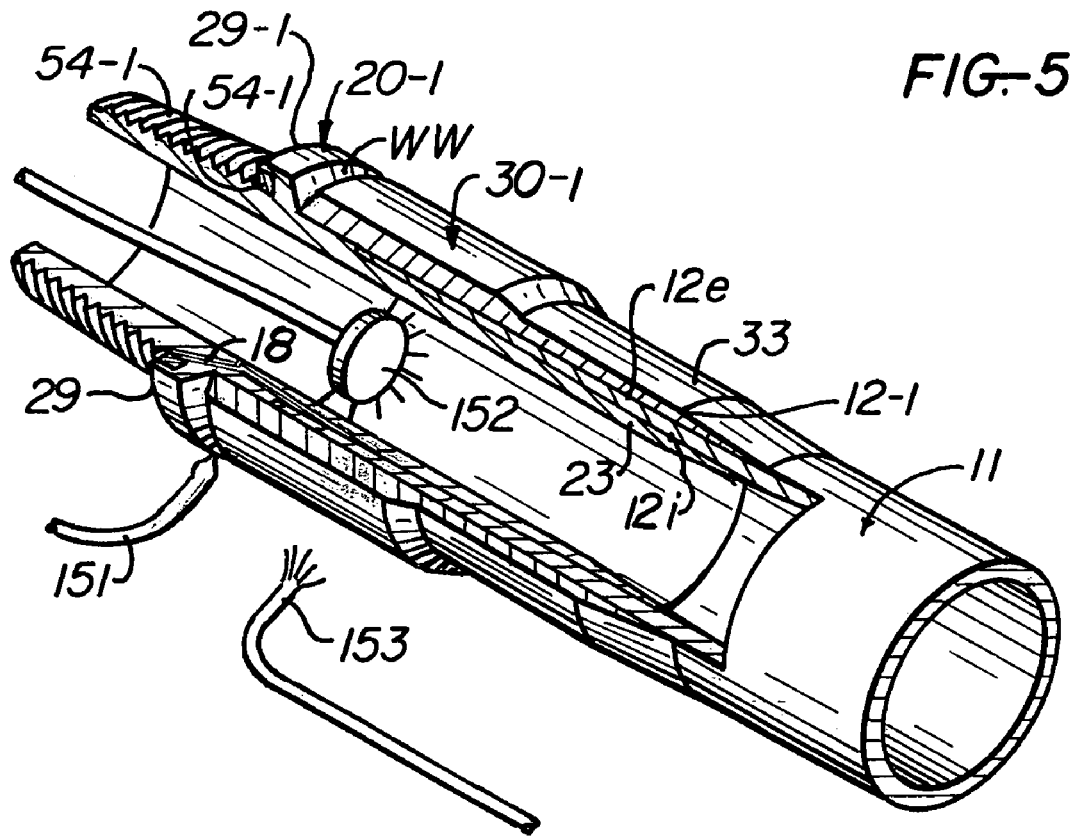
FIG. 5 is a further perspective illustration, in partial section, of the tooling arrangement useful in combining the inventive assembly into an integral fixture.
Figure 6:
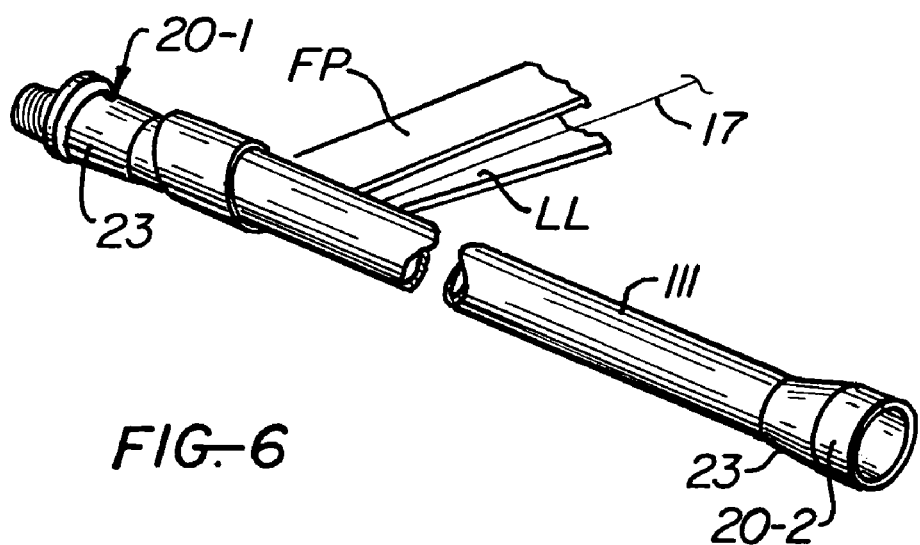
FIG. 6 is a further diagrammatic view, in perspective, illustrating the inventive implementation of a forming facility useful in forming the composite pipe segment on a rotary mount incorporating portions of the inventive end fitting assembly.
Figure 7:
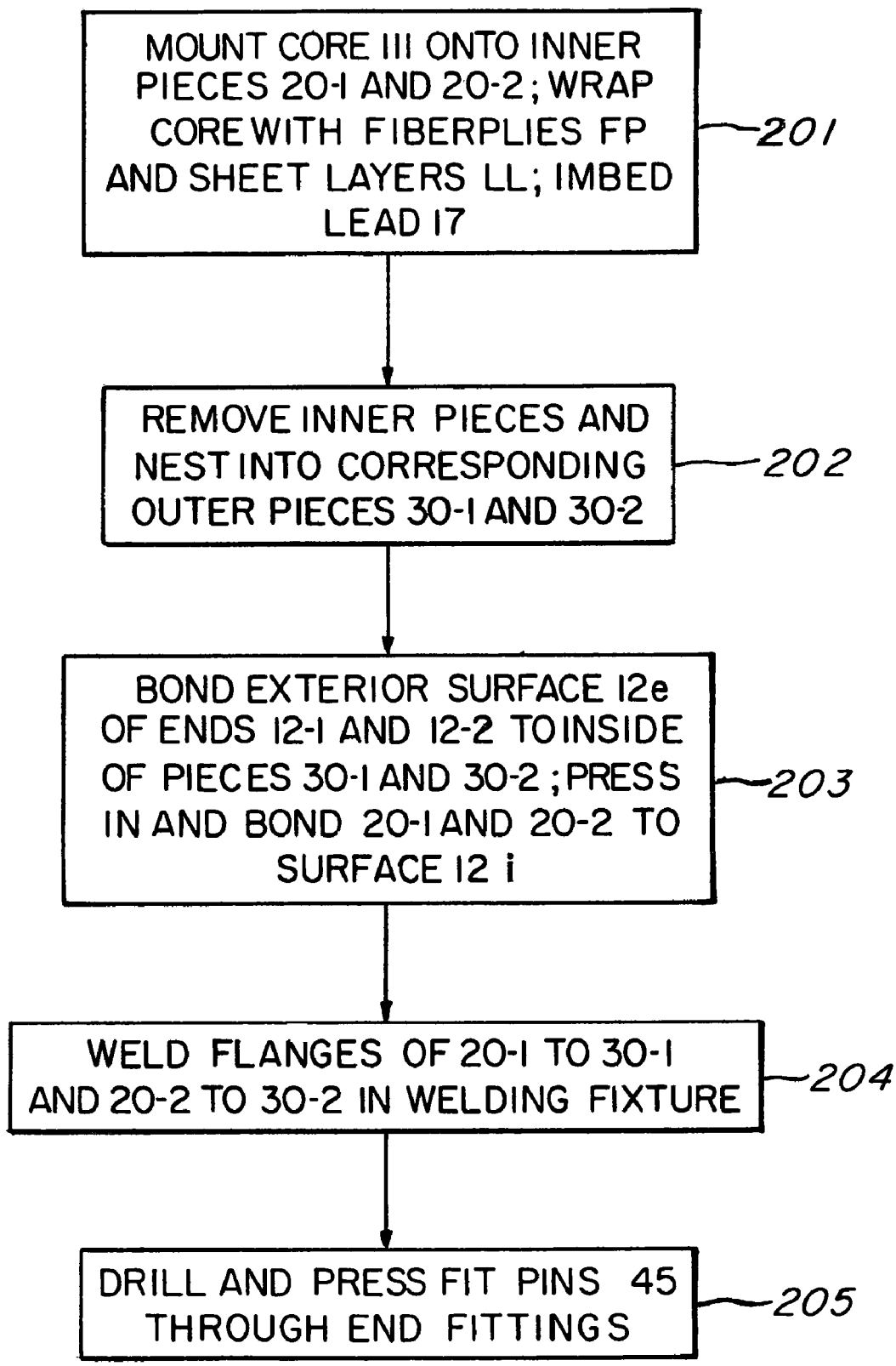
FIG. 7 is a sequence diagram of an end fitting assembly sequence in accordance with the present invention.

By particular reference to FIGS. 2-4 the inventive pipe assembly, generally designated by the numeral 10, comprises a tubular composite pipe segment 11, formed by laying up reinforcing fiber, such as carbon fiber, preferably laid in stress determined orientation patterns between plies of interleaved wrapping of generally impervious elastic sheets, all bonded together by resinous filler to form a cylindrical structure of a generally uniformed wall thickness over most of its length. A selected portion of each end of pipe segment 11 is tapered along a generally uniform taper to a reducing wall thickness, illustrated as a first tapered end 12-1 and a second tapered end 12-2, each defined by an inner frustoconical surface 12$i$ and an oppositely aligned exterior frustoconical surface 12$e$ that cooperatively form the tapered ends that are then received within conforming circular cavities formed between a set of nested high strength steel end coupler pieces shown as an inner end piece 20-1 nested in an outer end piece 30-1 to form an annular cavity therebetween for receiving tapered end 12-1 and a similarly nested set of end pieces 20-2 and 30-2 forming a similar cavity to receive the other tapered end. Like numbered parts functioning in like manner, each of the annular cavities are formed by axially aligning an exterior tapered surface 22$e$ formed on the exterior of a skirt 23 included in both the end pieces 20-1 and 20-2 adjacent an oppositely tapered surface 32$i$ on the interior of a skirt 33 included in end pieces 30-1 and 30-2. Surfaces 22$e$ and 32$i$ are each closely matched to the respective dimensions and tapers of the interior and exterior surfaces 12$i$ and 12$e$ of each of the ends 12-1 and 12-2, thereby providing a self-centralizing assembly with closely held bonding interface that can then be effected by any well known high temperature epoxy resin. The close fit of this bonding process is further enhanced by axial advancement and close dimensional matching between the coaxially nested exterior and interior pieces so that the exterior piece forms a peripheral support for the tapered end as the interior piece is slid into its position.

Each of the skirts 23 and 33, moreover, include a radially matched set of lateral openings 24 and 34 dimensioned for press fit, or interference receipt, of corresponding pins 45 that also pass through corresponding circular openings 15 formed in the tapered ends 12-1 and 12-2 once the ends are fully received, bonded and indexed within their receiving cavities. This same indexed alignment orients the exposed ends 18 of conductor leads 17 that are woven into the filament matrix of the pipe segment 11 into alignment with longitudinal drillings 37 formed in skirts 33 to effect an electrical connection across the pipe joint herein described. Beyond this bonding receipt each of the pieces is formed as a closely dimensioned telescoping cylindrical segments 26 and 36 which are each provided with corresponding exterior flanges 29 and 39 aligned next to each other when the skirts are properly positioned. Of course, the same drillings 37 extend through the flange 36 on the exterior to convey the lead ends 18 therethrough.

Those skilled in the art will appreciate that while pieces 20-1 and 20-2, and also pieces 30-1 and 30-2, are described above by identical descriptions, in application one of the nested end piece sets serves as the male portion of the threaded joint, otherwise referred to as the 'pin end', and the other end piece set serves as the female threaded, or the 'box end'. Accordingly, those parts of the inner end pieces 20-1 and 20-2 that are exterior of flanges 29 are of necessity different depending on the joint function that is formed. Thus interior end piece 20-1 includes a threaded boss 51-1 extending beyond the exterior shoulder 29-1 of the flange 29 that is conformed for threaded receipt in a threaded cavity 51-2 formed in the other exterior shoulder 29-2 of the other flange 29 on the interior end piece 20-2. Each of the flanges 29, moreover, includes drilling continuations shown as drillings 27-1 and 27-2 aligned with drillings 37, drilling 27-1 conveying the conductor end 18 into a circular recess 53-1 formed in the flange shoulder surface 29-1 where the lead is connected to one of several insulated rings 54-1 conformed for receipt within the interior of recess 53-1.

At the other end piece 20-2 a similar drilling 27-2 is indexed with drilling 37 in the exterior piece 30-2 to convey the other lead end 18 into a manifold 56 formed in flange 29 and terminating in one or more openings 57 through shoulder surface 29-2 opposing the recess 53-1 when the ends are threadably mated. Opening 57, in turn, is provided with a spring biased piston 58 carrying a bayonet point 59. Once the end fittings are joined a pressure fitting 56$p$ in manifold 56 is then useful to pressurize the manifold interior, advancing piston 58 against the spring bias to drive the bayonet point 59 through the insulation on the opposingly aligned contact ring 54-1. In this manner circuit continuity is effected between the conductors 17 imbedded in the joined segments regardless of their relative orientation.

It will be appreciated that each of the conductive filaments 17 may be variously effected either as an electrical power lead, a signal lead or even a fiberoptic filament. Of course, known techniques of signal superposition, frequency and/or pulse modulation or other signaling formats can then be effected by these leads to bring out down hole information directly to the rig operator as the drilling is taking place which can then be used to modify, in known techniques, the drilling direction and the cutting rate, commonly referred to as LWD or 'logging while drilling' and MWD or 'measurnig whilr drilling.' In this manner all the control and pipe compliance conditions can be conveniently accommodated in a pipe string that, because of its light weight, is particularly suited for ultra deep and/or extended reach drilling.

Those in the art will further appreciate that the foregoing arrangement is particularly suited for custom forming of composite pipe segments 10 by way of the nested end fittings described herein. By particular reference to FIGS. 5-7 the inner end pieces 20-1 and 20-2 may be combined with a forming mandrel effected by an inner sleeve 111, to form the turning core for the subsequent winding of fiber plies FP and the remaining interleaved layers LL forming the composite pipe 11, in step 201. In this step the winding pitch, fiber density and the selection of any sealing wraps may also be determined by the particular parameters of the well and the mandrel structure may be further stiffened and assisted by internal pressurizatioin while the fiber lay-up tension is controlled. Of course, conductive leads 17 may be concurrently also imbedded into the wrap, again in accordance with the type and nature of the signals and/or power that may be conveyed thereon. Once the structural conditions are met the inner end pieces are withdrawn from the core layer 111 and thereafter nested in the exterior pieces 30-1 and 30-2 in step 202. A bonding agent, such as a high temperature epoxy resin is then applied to the pipe ends 12-1 and 12-2 and the ends are then re-positioned into the interiors of pieces 30-1 and 30-2 with the inner pieces 20-1 and 20-2 then pressed into their common interiors, shown as the self-centralizing step 203. In the course of this same step the exposed conductor ends 18 are conveyed into their appropriate drillings to be thereafter connected either to the bayonet contact 59 or the contact ring 54-1. In step 204 the foregoing assembly is then brought into a spray cooled welding fixture illustrated in FIG. 5 in which a weld WW is applied by a welding device 151 to join the exterior flanges of the nested end pieces 20-1 and 30-1 to each other (and by the same example also the nested end pieces 20-2 and 30-2) while water spray heads 152 and 153 cool the adjacent structure. Once thus fixed by their flanges the inner and outer end pieces with the ends 12-1 and 12-2 captured therebetween are then drilled, in step 205, with perforations 34 which thereafter receive press fit pins 45.

In this manner a self-centralized end arrangement is useful both in the manufacture and also in effecting a closely held bond interface between the high strength metal end pieces and the composite pipe segment with the interface further stabilized and fixed by welding and press fit pins. The resulting high strength joint is then further complemented by the appropriately selected lay-up pitch, weave density and interleaving that are selected for the particular task. Thus both the fabrication and the ending structure are rendered both highly effective and convenient.

Obviously, many modifications and variations can be effected without departing from the spirit of the invention instantly disclosed. It is therefore intended that the scope of the invention be determined solely by the claims appended hereto.

It is claimed:

1. A pipe assembly useful in a repeating end-to-end threaded connection for forming a pipe string, comprising:
   a generally tubular composite pipe segment defined by a first end and a second end each said first and second end including a generally equal tapered wall reducing in thickness at the end opening, each tapered end wall being defined by substantially symmetrical interior frustoconical surfaces in opposing alignment with corresponding substantially symmetrical exterior frustoconical surfaces;
   a first and second end fitting each including an interior and an exterior tubular piece, said interior piece being conformed for coaxial telescopically nested receipt within said exterior piece, said interior and exterior pieces each further including respective skirts conformed for mating alignment along a corresponding one of said interior and exterior frustoconical surfaces for bonding therewith;
   a threaded boss formed on the free end of the interior piece of said first end fitting; and
   a threaded opening formed within the free end of the interior piece of said second end fitting conformed for threaded receipt of a mating boss to make the connection.

2. A pipe assembly according to claim 1, wherein:
   said interior and exterior piece skirts are conformed for peripheral support and adjacent welded engagement upon the nested receipt thereof.

3. A pipe assembly according to claim 1, wherein;
   said composite pipe segment includes carbon fiber filament arrays.

4. A pipe assembly according to claim 1, wherein;
   said composite pipe segment further includes impervious wrapping layers.

5. A drilling string, comprising:
   a plurality of filament wound composite pipe sections formed by tubular wal. sections formed at their opposite ends with, at least, exterior tapers converging distally inwardly to form respective first and second tapered extremities, the wall sections being further formed with at least one longitudinal electrical lead conductor embedded therein and terminating in first end second end portions at the respective opposite ends;
   respective pairs of male and female couplers interposed between the adjacent ends of respective adjacent pipe sections, each pair formed with male and female coupler bodies formed on their respective one extremities with respective male bosses and female boxes, screwably joined together and formed on their respective extremities opposite the respective one extremities with concentric inner and outer tubular support sleeves, at least the respective outer sleeves being tapered to diverge distally toward an adjacent extremity of a respective adjacent pipe section to cooperate with the respective inner sleeves to form distally diverging tapered cavities complementally receiving the respective said adjacent extremities of the respective said pipe sections;
   respective electrical contact rings mounted in the respective one extremities of one of said couplers of the respective said pairs of couplers and connected in electrical communication with the respective first end portions of the respective electrical lead conductors;
   respective electrical contacts in the respective one extremities of the respective other one of the couplers of said pair of couplers, connected with the respective second end portions of the respective lead conductors, and disposed in electrical contact with the respective electrical rings.

6. The pipe string of claim 5 wherein:
   the respective outer sleeves are cylindrical and formed on their respective outer surfaces to be stepped down to cooperate in a progressively reduced tubular wall.

7. A pipe assembly useful in a repeating end-to-end threaded connection for forming a pipe string, comprising:
   a generally tubular composite pipe segment defined by a first end and a second end each said first and second end including a generally equal tapered wall reducing in thickness at the end opening, each tapered end wall being defined by substantially symmetrical interior frustoconical surfaces in opposing alignment with corresponding substantially symmetrical exterior frustoconical surfaces;
   a conductive lead imbedded in said pipe segment including exposed portions at each end thereof,
   a first and second end fitting each including an interior and an exterior tubular piece said interior piece being conformed for coaxial telescopically nested receipt within said exterior piece, said interior and exterior pieces each further including a skirt conformed for mating alignment along a corresponding one of said interior and exterior frustoconical surfaces for bonding therewith;

a threaded boss formed on the free end of the interior piece of said first end fitting;

a threaded opening formed within the free end of the interior piece of said second end fitting conformed for threaded receipt of a mating boss to make the threaded connection;

a contact ring deployed in concentric alignment at the free end of one of said interior pieces connected to one of said end portions; and a spring biased piercing projection received in the peripheral end edge of the other one of said interior pieces connected to the other one of said end portions.

8. A pipe assembly connected in a repeating end-to-end threaded connection for forming a pipe string, comprising:

a generally tubular composite pipe segment defined by a first end and a second end each said first and second end including a generally equal tapered wall reducing in thickness at the end opening, each tapered end wall being defined by substantially symmetrical interior frustoconical surfaces in opposing alignment with corresponding substantially symmetrical exterior frustoconical surfaces;

a conductive lead imbedded in said pipe segment including exposed portions at each end thereof, a first and second end fitting each including an interior and an exterior tubular piece said interior piece being conformed for coaxial telescopically nested receipt within said exterior piece, said interior and exterior pieces each further including a skirt conformed for mating alignment along a corresponding one of said interior and exterior frustoconical surfaces for bonding therewith;

a threaded boss formed on the free end of the interior piece of said first end fitting;

a threaded opening formed within the free end of the interior piece of said second end fitting conformed for threaded receipt of a mating boss to make the threaded connection;

respective electrical contact rings mounted in the free end of one of the interior pieces and connected in electrical communication with the respective exposed portion of the conductive lead of respective pipe segment end;

respective electrical contacts in the respective free ends of the respective other one of the interior pieces, connected with the respective exposed portion of the conductive lead of respective pipe segment end, and disposed in electrical contact with the respective electrical rings.

* * * * *

UNITED STATES PATENT AND TRADEMARK OFFICE
CERTIFICATE OF CORRECTION

PATENT NO.        : 7,458,617 B2                                   Page 1 of 1
APPLICATION NO.   : 10/952135
DATED             : December 2, 2008
INVENTOR(S)       : James C. Leslie et al.

It is certified that error appears in the above-identified patent and that said Letters Patent is hereby corrected as shown below:

Column 8, line 17, delete "wal." and insert --wall--.

Signed and Sealed this

Thirtieth Day of June, 2009

JOHN DOLL
*Acting Director of the United States Patent and Trademark Office*